March 2, 1965  A. GRAF  3,171,194

APPARATUS AND METHOD FOR MANUFACTURING FASTENERS

Original Filed Nov. 17, 1961  4 Sheets-Sheet 1

INVENTOR.
ARTHUR GRAF
BY Amster & Levy
ATTORNEYS

March 2, 1965  A. GRAF  3,171,194
APPARATUS AND METHOD FOR MANUFACTURING FASTENERS
Original Filed Nov. 17, 1961  4 Sheets-Sheet 3

INVENTOR.
ARTHUR GRAF
BY
Amster & Levy
ATTORNEYS

INVENTOR.
ARTHUR GRAF

United States Patent Office
3,171,194
Patented Mar. 2, 1965

3,171,194
APPARATUS AND METHOD FOR MANUFAC-
TURING FASTENERS
Arthur Graf, 120 W. 45th St., New York, N.Y.
Continuation of abandoned application Ser. No. 153,014,
Nov. 17, 1961. This application Mar. 30, 1964, Ser.
No. 356,360
13 Claims. (Cl. 29—410)

The present invention relates generally to slide fasteners, and in particular to machinery and methods for the manfacture of concealed types of slide fasteners.

The subject matter of this invention has been disclosed and described in my prior copending application, U.S. Serial No. 153,014, filed November 17, 1961, now abandoned, with respect to which the present application is a continuation.

In machines of this type it is common for a piece of strip stock to be advanced through a sequence of fabricating stations. Various dies and tools operate at each of the successive fabricating stations in turn to form the strip stock into the necessary shape to define a fastener element profile including the engagement head and the clamping jaw or bight curving about in opposing relationship thereto. Other tools are provided which form the required engagement prongs and recesses on the engagement heads of the fastener elements. At a final fabricating station the stringer tape is inserted into the bight concavities of successively formed fastener elements and a crimping tool clinches the attachment bight toward the engagement head to achieve crimping of the fastener elements to the stringer tape.

In the past, difficulties have been encountered in the crimping step as it has been performed by prior art methods and machines. In particular, it has been found that the compressive force applied by spaced jaws such as disclosed in Patent Nos. 2,336,662, 2,444,706 and 2,744,561 caused wobbling and misalignment of the fastener elements at the instant of crimping especially where the fastener elements extend at an angle to the tape as in the case of the concealed type of slide fastener. As a result, many of the fastener elements are permanently crimped to the stringer tape in a disoriented manner. Thus, the slide fastener manufacturing machine is liable to produce fasteners having one or more fastener elements which are substantially out of alignment with the remaining fastener elements. This misalignment may cause difficulty in the function of the slide fastener, such as preventing the fastener elements from interengaging smoothly and readily when the slide trolley is transposed rapidly along the rows of fastener elements. In one prior art method as disclosed in Patent No. 2,267,782, the crimping tool was arranged for movement in the path of stock advancement so as to engage a cut jaw portion of the fastener element in order to clamp it onto the tape while the fastener element is being cut. This method required that the tape be temporarily displaced from its feed path to receive a fastener element. The machine of the present invention, however, avoids the need for displacement of the stringer tape from its feed path and the cutting of the special surface engaged by the crimping tool.

Accordingly, it is broadly an object of this invention to provide an apparatus and an advantageous method of manufacturing slide fasteners which will produce an improved and more uniform product in a more reliable and less costly manner. In particular, it is an object of this invention to provide apparatus and methods by means of which the fastener elements may be crimped to the stringer tapes without producing wobbling and misalignment by mutual cooperation between the crimping and final severing steps.

In an illustrative machine for making fasteners by advancing fastener element stock through a sequence of fabricating stations and forming the stock into fastener elements having a selected profile, the embodiment in accordance with this invention comprises means at a selected fabricating station for crimping the fastener elements to a stringer tape. The machine is arranged to deliver the stock to the selected fabricating station with holding tab portions protruding rearwardly of the selected profile in the direction of stock travel. Forming means are provided at the selected fabricating station which are operable concurrently with the crimping means and are shaped so as to sever the holding tab portions. The forming means will therefore be in a tab cut off phase while the attachment bight is being crimped, and the action of the forming means as it cuts into the fastener element stock is therefore effective to hold and stabilize the fastener elements during the application of crimping pressure thereto to prevent wobbling and misalignment.

It is a further object of the invention to provide a double-header machine for feeding two tapes close to one another and wherein the dies for forming the elements have the full contour of the elements thus enabling the dies to be used as nests to hug the elements and prevent distortion while the elements are being clamped to the tape.

In accordance with method aspects of this invention, there is provided an illustrative process for making fasteners of the type described above which comprises the steps of delivering the fastener element stock to a fabricating station with holding tab portions protruding beyond the limits of the selected fastener element profile, and at the fabricating station concurrently crimping the fastener elements to a stringer tape and severing the holding tab portions so as to hold the fastener elements during crimping thereof.

The foregoing brief summary, as well as further objects and features of this invention, may best be appreciated by reference to the following detailed description when read in connection with the accompanying drawings, in which.

Referring in detail to the drawings, the numeral 10 generally designates the head portion of a fastener manufacturing machine. A pair of long strips of metal stock S having parallel edges are fed through the head portion 10 from front to rear, the direction of feed being indicated by the arrow *a* in FIG. 3. In general terms, the head portion 10 operates to stamp the forward or leading ends of the stock S continuously into a succession of fastener elements E, and to crimp each of the elements E, as it is formed, onto the edges of respective fabric stringed tapes T. The stringer tapes T are indexed upwardly continuously, as indicated by the arrows *b* in FIG. 2, with the result that each stringer tape T is fed from the head portion 10 with a row of fastener elements secured along its edge.

Figure 4:
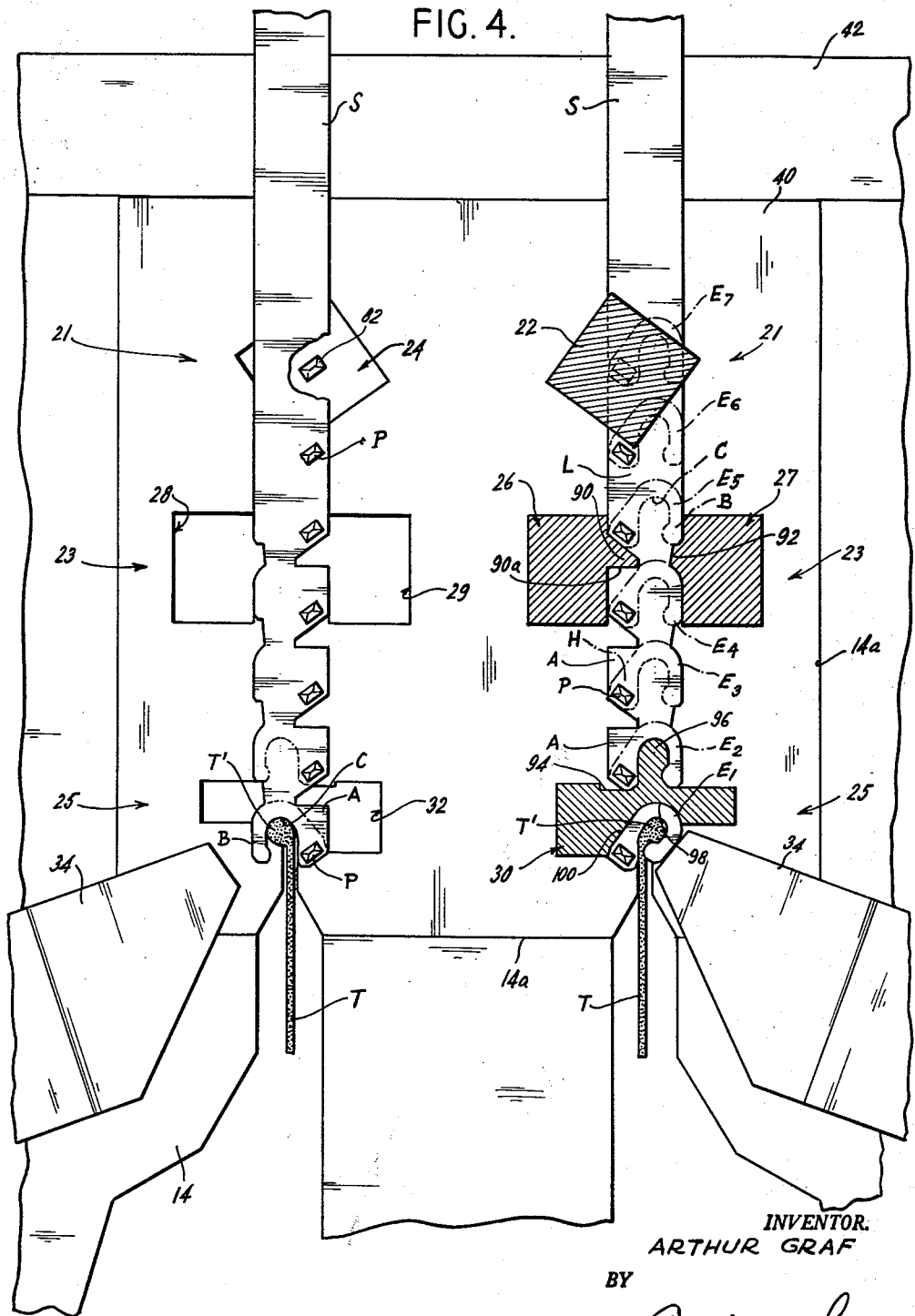
FIG. 4 is a section taken along the line 4—4 of FIG. 3.

Stated generally, the strips of stock S and S' are fed simultaneously through the machine head portion 10 in a rapid and intermittent manner. Each strip S and S' is fed over a plurality of fabricating stations and halts momentarily at each station while work is performed thereupon. In FIG. 4, it may be seen that the strip S passes successively through three fabricating stations designated generally by reference numerals 21, 23, and 25. Stamping means, in the nature of dies, to be presently described in detail, are located at each of these stations to form, by successive cuts, the end portion of the strip S into the finished shape of a fastener element and finally sever it from the body of the strip S. At the final station 25, crimping means which includes a crimping tool 34 is provided to secure the finished fastener element onto a stringer tape. The die at the final fabricating station 25 is so constructed that in providing the final cut on the strip S, it provides a firm seat for immovably supporting the finished fastener element and permits the crimping tool 34 to perform its securing operation without moving the main body portion of the fastener element.

Since the mechanisms for feeding the stock S through the machine 10 and indexing the stringer tapes T are conventional and need not differ in any way from the corresponding mechanisms of any well known prior art device, illustration and description thereof is omitted.

The machine head 10 includes a bed plate 12 which is formed with passageways 12a through which the stringer tapes T pass as they are upwardly fed in a path transverse to the path of travel of the stock. A stationary die-holding block 14 rests on the bed plate 12, and a guide block 16 rests on the block 14, both being suitably bolted to the bed plate 12 so as to be rigid therewith. The undersurface of guide block 16 is relieved at locations 16a, FIG. 3, to provide a shallow elongated feed space for each of the strips of stock S as the latter is fed between the blocks 14 and 16.

Along each of the stock feed paths thus defined is positioned a row of fabricating dies 22–32 which form each fastener element in turn as the stock is fed past. Dies 24, 28, 29, and 32 are mounted below the stock S by being inserted within mounting channels 14a formed in the die-holding block 14. These dies are surrounded and separated by various suitably shaped spacer blocks 40. The channels 14a open through the rearward end of block 14, and a clamp block 42 extends across the rearward end of the block 14 to close off the open ends of channels 14a. Lock screws 44 are tapped through the clamp block 42 to secure the rows of lower dies 24, 28, 29, and 32 and the spacer blocks 40 in place. This arrangement permits removal of the dies 24, 28, 29, and 32 for replacement when they become worn, by releasing lock screws 44 and then removing the aforesaid dies from channels 14a. Much of this structure is omitted from FIG. 4 so as not to obscure features of machine 10 more pertinent to the inventive aspects thereof.

Figure 1:
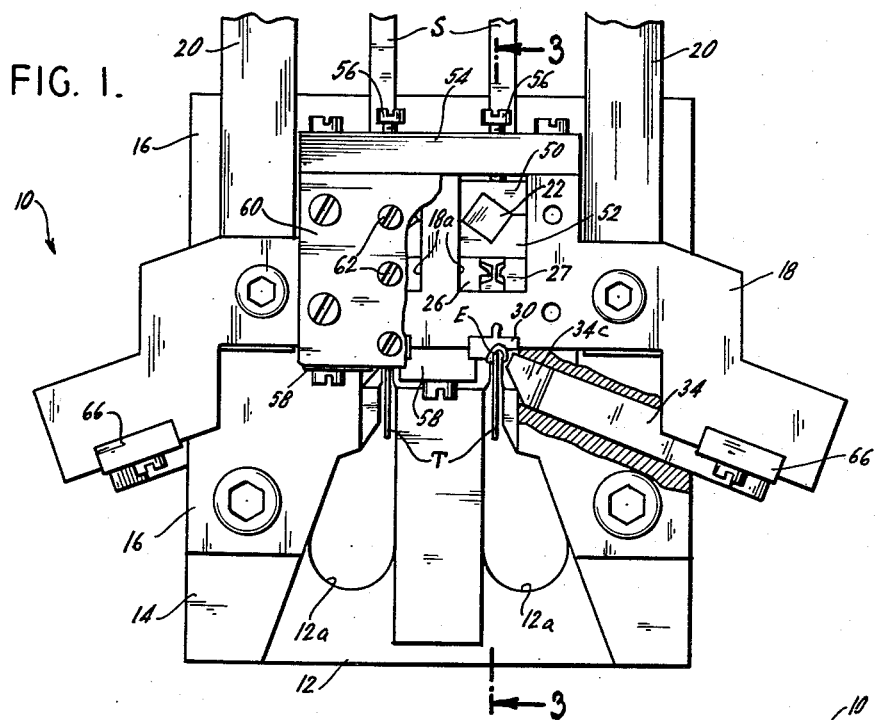
FIG. 1 is a top plan view of the head portion of a fastener-manufacturing machine in accordance with the present invention.

Dies 22, 26, and 30 are mounted above stock S on a reciprocating head 18 which is formed with a similar pair of channels 18a opening through the rearward end thereof. Within these channels are mounted the dies 22, 26, and 27, and suitably shaped spacer blocks 50 and 52 interspersed therebetween. A clamp block 54 is bolted across the rearward end of head 18, and lock screws 56 are tapped therethrough to lock the aforesaid dies and spacer blocks in place while nevertheless permitting easy removal thereof by releasing the lock screws 56. The dies 30 are mounted in a specially formed separate channel at the forward end of the head 18 and are removably clamped therein by three blocks 58 overlapping the dies 30 and bolted to the head 18. A plate 60 (partly broken away in FIG. 1) is bolted in place to cover over the above-described members. Pairs of adjusting screws 62 are tapped through the cover plate 60 for adjusting the height of the upper dies so that they all strike the stock S at the same time when the reciprocating head 18 is lowered. In order to operate the moving dies, the head 18 is driven through a rapid vertically reciprocating stroke (as indicated by the arrow c in FIG. 3) by a pair of driver rails 20 to which it is bolted. The rails 20 are in turn actuated by conventional mechanisms sufficiently well known not to require illustration or description herein.

Crimping tools 34 are slidably mounted within diagonally oriented channels 16b formed in the underside of guide block 16 and are reciprocated therein at timed intervals to perform the necessary crimping operation on each fastener element as it is put into finished form by the dies. In order to drive the crimping tools 34 toward the stock S, there are provided drivers 66 bolted to the reciprocating head 18. The lower ends of drivers 66 and the outer ends of camming tools 34 are formed with abutting camming surfaces 66a and 34a respectively which are suitably angled to cam crimping tools 34 through channels 16b and against the stock S when the head 18 is lowered. The crimping position to which the tool 34 is moved upon lowering of head 18 is seen at the right hand side of FIG. 4. On the upward stroke of head 18 the crimping tools 34 are retracted to their original position by return springs 68 housed in the block 14 and acting through push rods 70 against shoulders 34b formed on the outer ends of crimping tools 34. This retracted position is illustrated at the left in FIG. 4, and in FIGS. 1 and 2. It will be realized that since the two crimping tools 34 are both driven by the head 18 they are always in the same phase of their operating stroke, and that they are shown in positions corresponding to different phases in FIG. 4 simply for the purposes of illustration, to permit ready comparison of these different positions.

Stock S is advanced through head portion 10, entering it in the form of undifferentiated strips. The object is to form it into successive fastener elements having a selected profile, and to crimp these elements in rows along the edges of tapes T. As it advances along the feed paths, the stock S is progressively altered by the dies to assume the sequence of shapes seen at the left in FIG. 4 which more and more closely approximate the selected profile. The same sequence of shapes is also illustrated at the right in FIG. 4, but in addition the phantom profiles of the fastener elements $E_2$ through $E_7$ to be formed from the stock S are shown thereon. The fastener element $E_1$ is shown at the moment of completion, while inchoate fastener elements $E_2$ through $E_7$ are numbered in the order of their progression through the fabricating stations and thus in order of relative completion. Since the fabricating process is of the continuous feed type as described, the elements $E_1$ through $E_7$ may be regarded either as successive elements seen at the same time or as the same element at successive stages of the process.

The selected fastener element profile shown is especially adapted for the elements of a concealed fastener. These elements are adapted by reason of the said profile to lock the stringer tapes together in front of them, concealing the metal elements behind the fabric tapes. The profile in question includes an engagement head H which is formed with an elongated prong or projection P punched upwardly therefrom. The complementary concavity R on the lower side of the engagement head H left by the punching of prong P (seen in FIG. 3) serves as an engagement recess adapted to receive engagement prongs P of other fastener elements E for coupling the completed fastener elements E together in the well known manner. The selected fastener element profile further includes an attachment bight or clamping jaw B integrally joined to the engagement head H and curving about into opposing relation thereto. The curve of the attachment bight B partly encloses a concave interior or recess C sized to receive the enlarged attachment bead T' formed at the edge of each stringer tape T exposed to the forward end of the stock and shown to be equally spaced between the edges of the stock. The concavity C is forwardly directed, that is, it opens toward the forward direction (the direction of travel of stock S) and is so positioned that the forward motion thereof will automatically result in insertion of the bead T' into concavity C as each partly formed fastener element moves through the final fabricating station. Once the profile is established, the next object is to clinch the tip of the attachment bight B toward engagement head H to grip the stringer tape T therebetween and compress the enlarged attachment bead edge T' in the concavity C, thus permanently securing the completed fastener elements E to the tape T.

Figure 3:
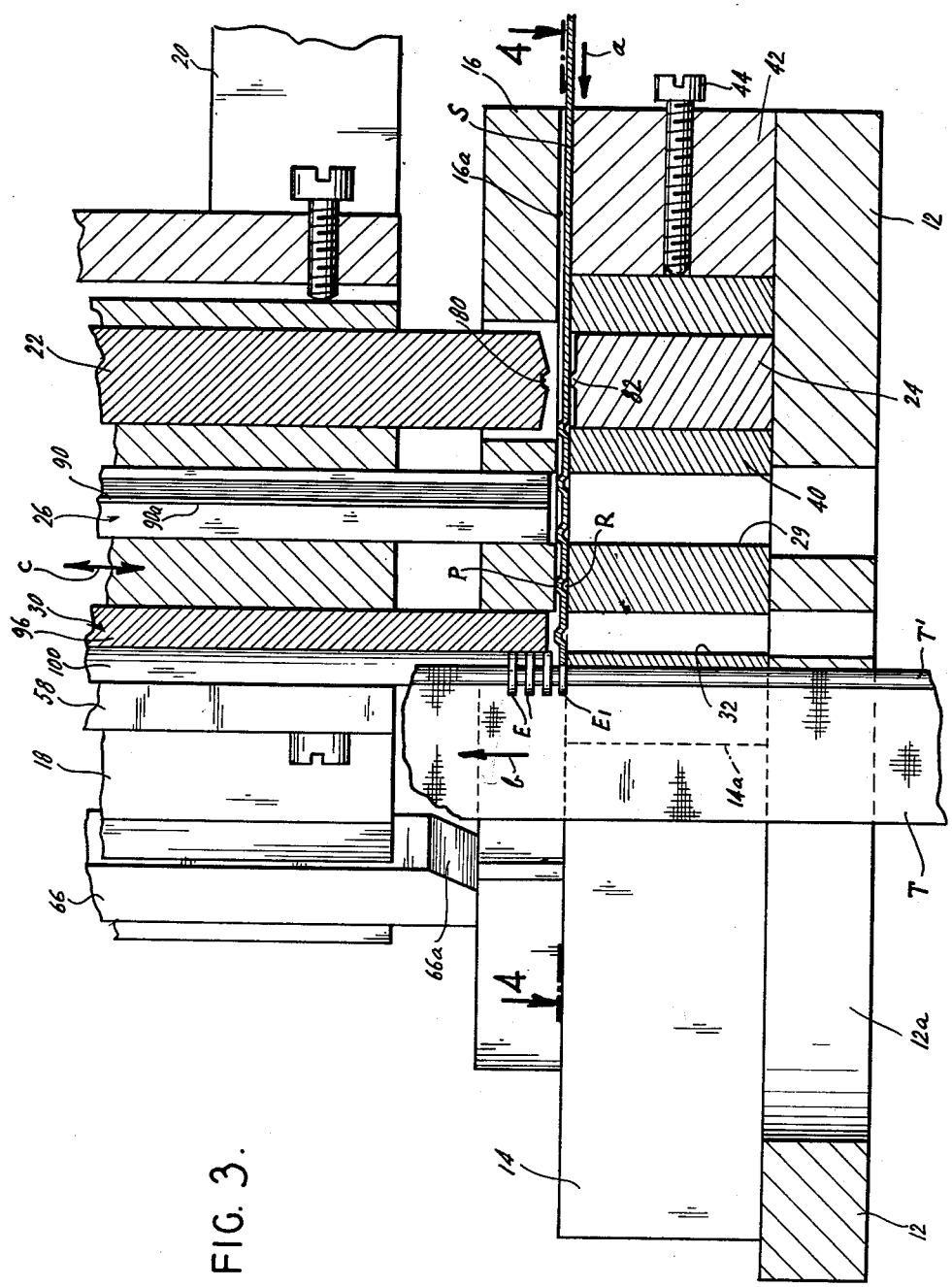
FIG. 3 is an enlarged section taken along the line 3—3 of FIG. 1.

The dies 22–32 are grouped into sets, each including one or more lower or stationary dies and one or more upper or movable dies cooperating therewith and each defining a fabricating station at which the required operations are performed. The fabricating stations are arranged along each stock feed path in a predetermined sequence so as to determine the order of the operations. The first fabricating stations 21 in the sequence include upper cupping dies 22 and lower dies 24 which cooperate to form the engagement prongs and recesses of the fastener elements. Suitably shaped prong-forming indentations 80 and recess-forming teeth 82 on dies 22 and 24 respectively best seen in FIG. 3 cooperate at the fabricating station 21 to punch prongs P and recesses R of inchoate fastener elements $E_7$ closely spaced adjacent one edge of the stock and extending at an angle thereto, by a single stroke of the head 18. It is seen from FIG. 3 that the surfaces 24a of dies 24 surrounding the teeth 82 are countersunk below the level of the feed path of stock S to provide clearance space for deformation thereof during the punching operation. Surfaces 22a of dies 22 surrounding the indentation 80 are slanted to provide a rake angle as illustrated in FIG. 3 so that the pressure of die 22 is exerted chiefly in the region of indentations 80 and teeth 82.

The second fabricating stations 23 include the path of upper dies 26 and 27 and the pair of lower dies 28 and 29 which cooperate to perform a preliminary forming operation on the stock S which establishes the beginnings of the desired fastener element profile. Upper dies 26 and lower dies 29 located between the two strips S are formed with cutting elements 90 which cooperate to make a cut defining the front surface of the engagement head H of the inchoate fastener elements $E_5$ and removing some of the material between those element $E_5$ and the preceding partly formed fastener elements $E_4$. Upper dies 27 and lower dies 28 located outside the two strips S are formed with cutting elements 92 which cooperate to define a portion of the outline of the convex surface of the arm of the attachment bight B of the partly formed elements $E_4$, to define a portion of the tip of the attachment bight B of the succeeding partly formed elements $E_5$, and to remove some of the material therebetween. The cutting elements 90 and 92 are spaced apart to leave therebetween links L in the strip S which connect the successive partly formed fastener elements $E_5$ and $E_4$. The connecting link L joins the element $E_5$, projecting beyond the limits of its selected profile to occupy the bight concavity C thereof, and projecting forwardly therefrom to join to the rear of the next preceding element $E_4$. The connecting links L serve primarily to provide a continuing stock-feeding connection between the successive partly formed fastener elements $E_2$ through $E_5$.

The third and final fabricating stations 25 include upper dies 30 and lower dies 32 which cooperate to finish the job of establishing the desired fastener element profile. The elements $E_2$ second in line are formed by the rear cutting edge 94 of dies 30 and 32. This edge 94 is shaped to complete the configuration of the forward side of the fastener element profile. It establishes the remaining portions of the outline of the forward side of the engagement heads A and completes the contour of the tips of the attachment bights B. In addition, a cutting rib 96 projecting from the edge 94 is formed to cut out the material occupying the bight concavity C extending substantially parallel to the edges of the stock and closer to one of the edges, thus preparing the bight concavity for the insertion of the stringer tape attachment bead edge T' thereinto. At the same time, this operation serves to cut off the link L connecting elements $E_2$ and $E_1$. This connecting link is no longer needed, as it has already served to advance elements $E_1$ through the last fabricating station, at which they are then secured to the stringer tapes T. The connecting link L between elements $E_3$ and $E_2$ remains, to be used for subsequently advancing elements $E_2$ to the position of elements $E_1$.

Figure 2:
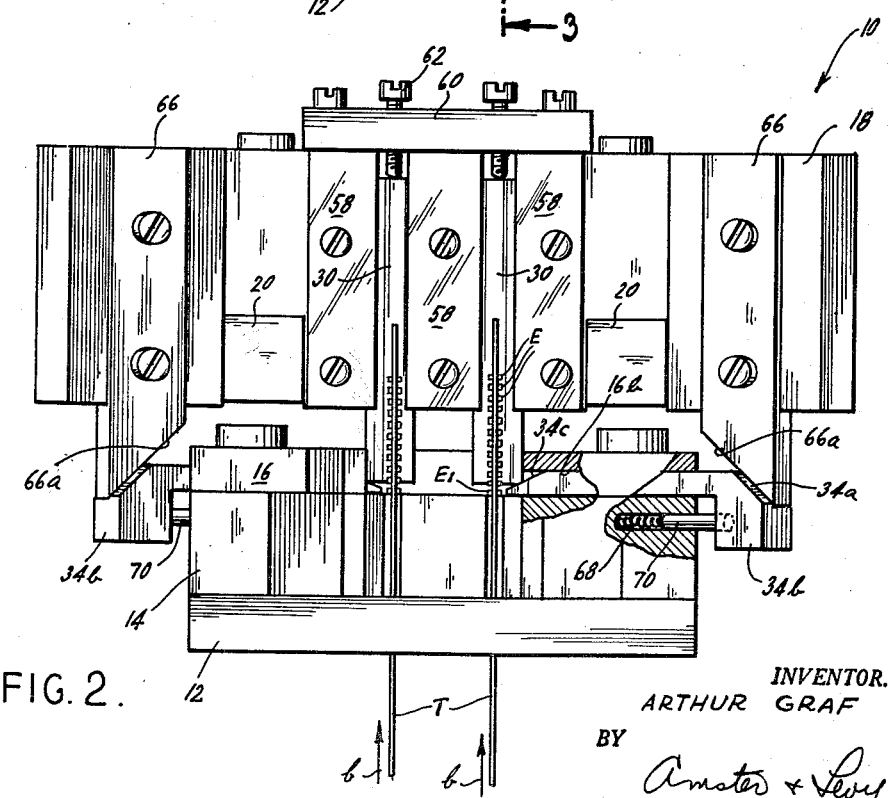
FIG. 2 is a front elevational view of the machine head portion.

As an element is advanced to the position of element $E_1$, the now open bight concavity C thereof moves into position to receive the attachment bead edge T' as seen at the left in FIG. 4. On the next downward stroke of the reciprocating head 18, cutting edges 98 of dies 30 and 32 sever the connecting links L which have just served to advance the elements $E_1$ to their present position, and thus complete the contour of the rearwardly facing side of the attachment bights B. At the same moment the drivers 66 cam the crimping tools 34 toward the stock S so that the pressure faces of the crimping tools 34 engage the uncut portion of the adjacent edge of the stock to clinch the attachment bights B toward the engagement heads H until the stringer tapes T are firmly crimped therebetween and the beads T' are combined within the bight concavities C. After the reciprocating head 18 rises to permit retraction of the crimping tools 34, the tapes T, with the recently completed fastener elements E secured thereto, are indexed upward to prepare for crimping of the succeeding fastener elements $E_1$ thereto. As seen in FIG. 2, the tips of crimping tools 34 are beveled at 34c to prevent contact thereof with the completed fastener elements E above the fastener element $E_1$ upon which the crimping operation is performed.

The pressure of the crimping tool 34 against the attachment bight B is transmitted to the engagement head A through the stringer tape T as the attachment bight is clinched thereagainst. Ordinarily, this pressure may cause the engagement head H to be displaced during crimping. As a result, the entire fastener element $E_1$ is disoriented at the moment of crimping so that it is permanently crimped to the stringer tape T in a position of misalignment.

In accordance with the present invention, the cutting elements 90 are formed with re-entrant surfaces 90a which extend away from the limits of the inchoate selected fastener element profile in the region of the engagement head A. The dies 26 and 29 therefore leave the stock S with a holding tab portion A adjoining the engagement head H of partly formed fastener element $E_4$, the tab A constituting integral excess stock material which protrudes substantially beyond the limits of the selected profile thereof. The purpose of the holding tab A is to provide a member which can be severed from the engagement head H along a backing portion of the rearward side of the profile during the crimping operation so that the die, in biting through the stock S to sever the tab A, is effective to prevent lateral distortion of the head H while crimping is taking place. It is necessary that the tab A extend from the inchoate profile of the partly formed fastener element $E_4$ in order that subsequent severance thereof will leave the completed fastener elements E with exactly the selected fastener element profile.

At the final fabricating station, the dies 30 and 32 are formed with tab-severing edges 100 which intersect the forward side of the profile at one edge of the stock, previously avoided by the reentrant surfaces 90a. Thus the edges 100 cut along the outlines of the engagement heads H of fastener elements $E_1$ to sever the tabs A therefrom and complete the desired shape of the engagement heads. The same downward stroke of the reciprocating head 18 which lowers the dies 32 to sever the holding tabs A also lowers drivers 66 to cam crimping tools 34 toward the stock S in the crimping stroke, thus timing the crimping and tab-severing operations to occur concurrently. As a result, during the moment when the crimping tools 34 are clinching the attachment bights B toward engagement heads H to exerting a misaligning force at an angle to the direction of stock travel, the tab-severing edges 100 are simultaneously gripping the engagement heads H to hold them against the misaligning force. By severing the holding tabs A the cutting edges 100 also contribute to the final cut which completes the selected fastener element profile.

It will now be apparent that a method of manufacturing fasteners in accordance with this invention includes the steps of forming fastener element stock S into fastener element $E_2$ approximating the selected fastener element profile and delivering the stock S to the final fabricating station with holding tab portions A protruding from the engagement heads H beyond the limits of the selected profile. At the final fabricating station the attachment bights B are clinched toward the opposing engagement heads H to crimp the fastener elements (now denominated $E_1$) to the stringer tapes T inserted in the bight concavities C, and concurrently therewith the holding tabs A are severed to hold the engagement heads H against the crimping pressure exerted thereon.

Thus, the apparatus and method of this invention provide for the steadying of the fastener element engagement heads at the critical moment when crimping pressure is exerted thereon, to prevent crimping of the fastener elements to the stringer tapes in a position of misalignment. As a result, this invention makes possible the production of more perfectly aligned slide fasteners which feature a more uniform and attractive appearance and superior smoothness of engagement.

Figure 5:
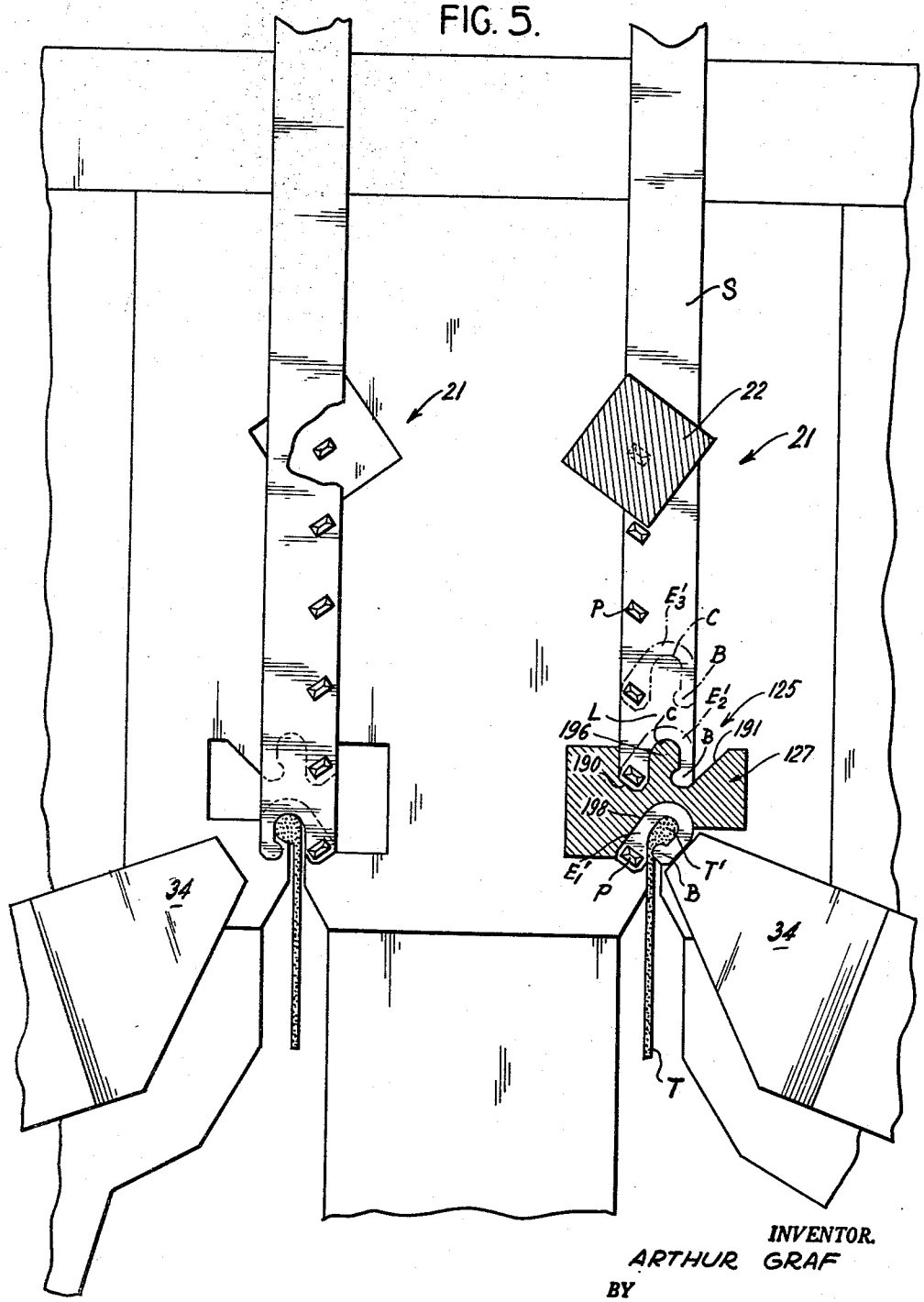
FIG. 5 is a sectional view similar to FIG. 4 of a modified form of the invention.

Referring to the embodiment shown in FIG. 5, the first fabricating stations 21 are the same as the embodiment shown in FIG. 4. However, in lieu of the second and third fabricating stations 23, 25, only fabricating stations 125 are employed and these single fabricating stations serve to better hug the elements and prevent distortion thereof as the elements are being applied on the tape T thereby assuring more accurate construction of the slide fastener.

The fabricating stations 125 include dies 127. The dies 127 are formed with cutting elements 190 and 191 which perform a cutting operation for defining the front surfaces of the fastener elements $E_2'$. The elements $E_2'$ are formed by the cutting edges 190, 191 shaped to complete the configuration of the forward sides of the fastener element profile intersecting the parallel edges of the stock. It also establishes the remaining portions of the outline of the forward side of the fastener elements and completes the contour of the tips of the attachment bights B. In addition, cutting rib 196 is provided to cut out the material occupying the bight concavity or recess (more closely spaced to one edge of the stock and extending substantially parallel to the edges of the stock), thus preparing the bight concavity for the insertion of the stringer tape attachment bead T' thereinto. At the same time, the dies 127 are arranged so as to cut off the link L connecting elements $E_2'$ and $E_1'$. This connecting link is no longer needed as it has already served to advance elements $E_1'$ through to the fabricating station 125, at which they are then secured to the stringer tapes T. The connecting link L between elements $E_2'$ and $E_3'$ remains to be used for subsequently advancing elements $E_2'$ to the position of elements $E_1'$. As an element is advanced to the position of element $E_1'$, the now opened bight concavity C thereof moves into the position to receive the attachment bead T' as seen to the left in FIG. 5. By the next downward stroke of the reciprocating head 18, butting edges 198 of dies 127 sever the connecting links L which have just served to advance the elements $E_1'$ to their present position, and thus complete the rearwardly facing sides of the profile extending from the intersection with the forward side of the profile at one edge of the stock to the other edge spaced from the forward end of the jaw part B. At the same moment the drivers 66 cam the crimping tools 34 towards the stock S so that the pressure faces of the crimping tools 34 engage the uncut portion of the stock to crimp the attachment bights B towards the prong P with the elements $E_1'$ being enclosed in the fastener profiles whereby the die prevents the elements $E_1'$ from being distorted. After the reciprocating head 18 rises to permit retraction of the crimping tools 18, the tapes T with the recently completed fastener elements $E_1'$ secured thereto are indexed upward to perform further crimping of the succeeding fastener elements $E_1'$ thereto.

From the foregoing description several important advantages over prior art apparatus and methods will be apparent. It will therefore be recalled that the flexible tapes are intermittently fed and guided along a fixed path in one direction so as to be received along the beaded edges in a compressive state within the recesses or concavities of the fastener elements. The fastener elements are therefore so oriented on the stock from which they are formed as to avoid the necessity of displacing the tapes into and out of the path of the strips of stock from which the fastener elements are separated in finished form. The orientation of the fastener elements is also such as to accommodate simultaneous severing of the finished element from the stock and engagement of one side of the stock by a single crimping tool for each strip of stock in order to avoid the need for a pair of crimping jaws and the spatial requirements incident thereto. Thus, both left and right hand tapes may be strung with fastener elements to form a complete fastener assembly in a single machine of less bulk which is also operative at a more rapid speed since there is no displacement of the tapes from their fixed paths of movement through the machine.

It is to be understood that, although the invention has been described with specific reference to particular embodiments thereof, it is not to be so limited since changes therein may be made within the full intended scope of this invention as defined by the appended claims.

What I claim is:

1. In a machine for making slide fasteners having means for respectively feeding stock and tape along directions which intersect at a crimping station, forming means operatively engageable with said stock for partially forming completed fastener elements therefrom leaving excess stock material on one side of the stock, crimping means movably mounted on the other side of the stock for advancement toward the fastener elements at the crimping station having a pressure face disposed at an angle to the feeding direction of the tape for engagement with the stock on said other side, final cutter means operatively engageable with the stock at the crimping station simultaneously with advancement of the crimping means for severing the completed fastener elements from the excess stock material opposed to said pressure face of the crimping means to prevent disorientation of the completed fastener elements when clamped onto the tape by the crimping means.

2. In an apparatus for forming slide fasteners having stock feeding means for intermittently advancing stock along a fixed path of movement intersecting a tape being advanced transversely of the stock, said tape having a bead along an edge exposed to the stock, the improvement comprising, cutter means movably mounted for cutting a bead receiving recess in said stock prior to advancement thereof into the path of said tape to partially form a fastener element, severing means operative upon advancement of each partially formed fastener element to a position receiving the bead in said recess for separating the fastener element from the stock along a severing edge disposed at an angle to said fixed path of movement of the stock, and crimping means advanced into engagement with the fastener elements on one side thereof only in a direction perpendicular to said severing edge for deforming the fastener element while engaged with the severing means along said severing edge to prevent displacement of the fastener from said fixed path of advancement.

3. The combination of claim 2 wherein said recess in the partially formed fastener element is defined between a head portion and a jaw portion extending generally parallel to said path of movement, said jaw portion being fully formed upon advancement of each partially formed fastener element to said bead receiving position for engagement by the crimping means, the head portion being partially formed with excess stock extending therefrom to be severed by the severing means.

4. The combination of claim 3 including cupping die means engageable with the stock prior to said partial formation of the fastener elements by the cutter means for forming prongs longitudinally extending substantially perpendicular to said severing edge.

5. The combination of claim 2 including cupping die means engageable with the stock prior to said partial formation of the fastener elements by the cutter means for forming prongs longitudinally extending substantially perpendicular to said severing edge.

6. In combination with apparatus for intermittently advancing stock and tape in transverse directions along intersecting paths, means for forming fastener elements having a predetermined profile from said stock and stringing the elements in fixed space relation along one edge of the tape including, cutting means for partially forming the fastener elements by engagement with said stock along a forward side of said profile to resist advancement of the stock, severing means operative in response to advancement of each partially formed fastener toward a position receiving said one edge of the tape for separating each fastener element from the stock along the remaining portions of the profile tending to laterally displace the fastener element from the path of advancement and crimping means rendered operative by the severing means for engaging each fastener element along part of said forward portion of the profile to resist said displacement from the path of advancement and cause clamping of the fastener element to said one edge of the tape.

7. The combination of claim 6 wherein said forward side of the profile defines a recess and a fully formed jaw part engaged by the crimping means, said jaw part being deformed by the crimping means from a position substantially parallel to said path of advancement to a clamping position at an angle to the path of advancement.

8. In a slide fastener stringer apparatus, the combination of a stationary bed supporting thin elongated stock for intermittent advancement in a stock feeding plane, guide means mounted on said bed for guiding movement of stringer tape in a fixed path perpendicular to said stock feeding plane, cupping die means movably mounted parallel to said tape for engagement with the stock to form prongs therein, cutting means movably mounted by the bed in spaced relation to the cupping die means for partially forming fastener element profiles enclosing said prongs, severing means connected to said cutting means for separating fastener elements from the stock upon advancement thereof into contact with the tape following engagement by the cutting means, said severing means including a backing portion resisting lateral displacement of the fastener element being separated and crimping means operatively connected to the cutting means and advanced into engagement with fastener elements being separated by the severing means for clamping the fastener elements onto the tape with a lateral displacing force resisted by said backing portion of the severing means.

9. In a method for forming a fastener element from flat, elongated stock having parallel edges, between forward advancements of the stock in a direction parallel to said edges, the steps of: punching an elongated projection adjacent one of said edges extending at an angle therefrom; cutting a forward profile of the fastener element including a recess portion extending substantially parallel to said edges in closer spaced relation to the other of said edges of the stock; severing the fastener element from an excess holding tab portion of the stock along said one of the edges to form a rearward profile of the fastener element extending from the intersection of said forward profile with said one edge of the stock to enclose the projection, said rearward profile terminating at the other edge spaced from the forward profile; and deforming the fastener element by pressure applied only to the other edge of the stock along a portion interconnecting the forward and rearward profiles.

10. In a slide fastener stringer apparatus including means for intermittently advancing flat, elongated stock having parallel edges along a path intersecting a stringer tape, means for guiding movement of the tape transverse to said path substantially equally spaced between said edges, cutting means engageable with the stock in spaced relation to the tape for partially cutting a fastener element along profiles including spaced portions of one of said edges of the stock, severing means engageable with the stock when in contact with the tape for separating each fastener element from the stock and crimping means advanced into engagement only with said spaced portions of the one edge of the stock in response to engagement of the severing means for deforming the fastener elements against the severing means thereby clamping the tape thereto.

11. In a machine for forming slide fastener elements from elongated stock having side edges and stringing said elements onto a flexible tape along a beaded edge thereof, means for guiding movement of the tape in one direction along a fixed path, means for guiding movement of the stock in another direction along a path intersecting the beaded edge of the tape, forming means engageable with the stock for cutting the fastener elements with recesses opening in said other direction between the side edges of the stock, crimping means operative upon reception of the beaded edge of the tape within said recesses for engaging one of said side edges of the stock to crimp the fastener elements onto the tape and severing means engageable with the stock adjacent the other of said side edges for resisting displacement of the fastener element from said fixed path by the crimping means while being separated from the stock.

12. In the machine defined in claim 11, wherein said severing means includes a cutter engageable with the stock at an angle to said side edges for separating the fastener elements from excess portions of the stock, said crimping means including a crimping tool and means displacing the crimping tool in a direction perpendicular to said angle for engagement with the stock simultaneously with the severing means.

13. In a method of forming and stringing fastener elements onto a tape, the steps of: feeding stock along a fixed path into contact with the tape; forming a fastener element from the stock with a profile from which excess stock material extends toward one side of the stock; applying a one-sided crimping force to the other side of the stock along the profile of the fastener element for clamping thereof onto the tape; and severing said fastener element from the excess stock material while said one-sided crimping force is being applied to resist displacement of the stock from said fixed path and prevent disorientation of the fastener element on the tape.

References Cited by the Examiner

UNITED STATES PATENTS

| 2,241,893 | 5/41 | Tuttle | 29—34.1 |
| 2,245,031 | 6/41 | Gottlieb | 29—34.1 |
| 2,267,782 | 12/41 | Behrens | 29—410 X |
| 2,336,662 | 12/43 | Wintriss | 83—158 |
| 2,437,793 | 3/48 | Silberman | 153—1 |
| 2,444,706 | 7/48 | Loew | 29—34.1 |
| 2,486,941 | 11/49 | Graf | 29—410 |
| 2,567,914 | 9/51 | Wintriss | 29—410 |
| 2,685,127 | 8/54 | Kaufmann | 29—410 |
| 2,744,561 | 5/56 | Cuckson | 153—1 |
| 2,837,136 | 6/58 | Legat | 153—1 |

WHITMORE A. WILTZ, *Primary Examiner.*

THOMAS H. EAGER, *Examiner.*